May 15, 1951 L. W. CORNWALL 2,553,302
SOLAR HEATING ASSEMBLY

Filed Oct. 13, 1947 3 Sheets-Sheet 1

INVENTOR.
LEO W. CORNWALL
BY *Everett N. Curtis*
ATTORNEY

May 15, 1951  L. W. CORNWALL  2,553,302
SOLAR HEATING ASSEMBLY
Filed Oct. 13, 1947  3 Sheets-Sheet 2
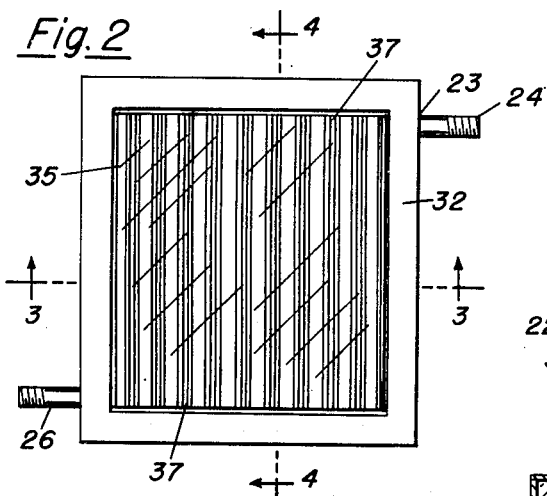
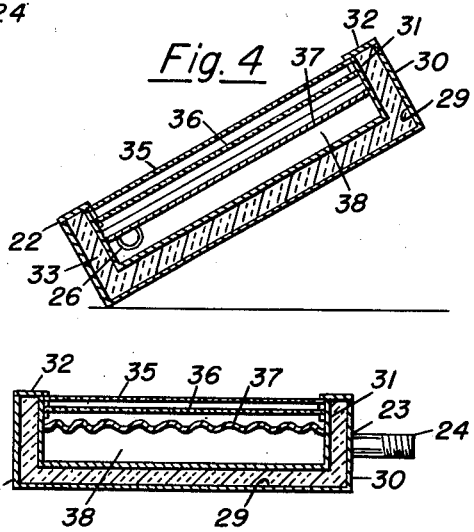
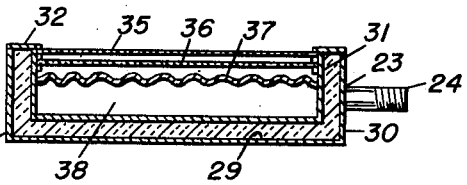
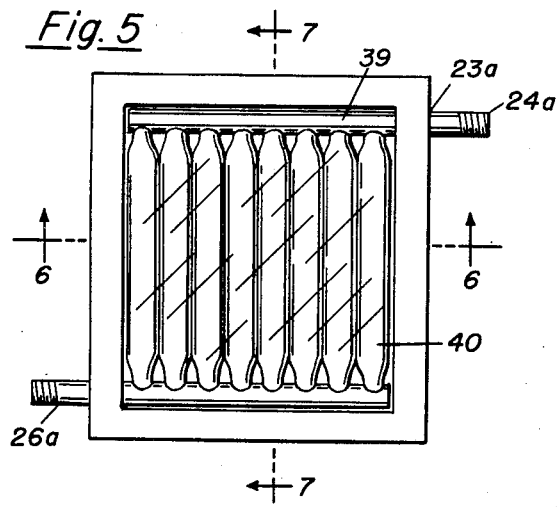
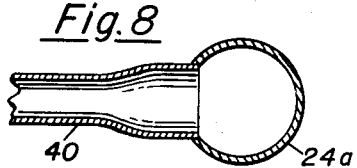
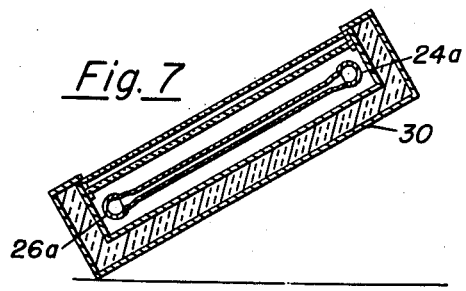
INVENTOR.
LEO. W. CORNWALL
BY *Everett N. Curtis*
ATTORNEY

INVENTOR.
LEO W. CORNWALL
ATTORNEY

Patented May 15, 1951

2,553,302

UNITED STATES PATENT OFFICE 2,553,302

SOLAR HEATING ASSEMBLY

Leo W. Cornwall, San Diego, Calif.

Application October 13, 1947, Serial No. 779,501

5 Claims. (Cl. 237—56)

My invention relates to solar heating assemblies, and its objects are to utilize in a manner heretofore unknown in the art, the rays of the sun for heating and maintaining the temperatures of the water of hot water circulating and storage systems so as to render such water available for domestic purposes; to provide automatic thermostatic means for controlling as desired the said temperatures and to guard against overheating of the water circulating through said systems; to furnish either gravity or pressure means for maintaining said circulation and for guarding against undue pressure against the walls of the tanks or pipes of said system; to insulate, shield and protect against injury from outside sources the various parts of said system; to provide as an important part of said system a special form of hot water heater in which the direct rays of the sun are constantly utilized and employed for heating the liquid contents thereof; to provide a portable form of heater which can be used in said system or readily used apart therefrom for camping or out of door purposes; to render said system available for buildings used for household purposes and to be built in and to form a permanent part of the structure thereof; to render the parts of said apparatus readily accessible for inspection, adjustment, removal, replacement and repair; and in general to provide an apparatus which is economical of construction, efficient in action and of prolonged life and durability. These and other objects will appear from the drawing and as hereinafter more fully set forth and described.

Attention is hereby directed to the drawing, illustrating preferred forms of my invention, in which similar numerals of designation refer to similar parts throughout the several views, and in which, Figure 1 is a diagrammatic representation of the closed circuit assembly embodying my improved heating apparatus, illustrating the application thereof to a dwelling house, an outline view of which is shown; also shown in dotted lines is an adaption of said apparatus to a pressure system;

Fig. 2 is a plan view of the solar heat absorption unit shown in Fig. 1;

Fig. 3 is a section on line 3—3 of Fig. 2, looking in the direction of the arrows;

Fig. 4 is a section on line 4—4 of Fig. 2, looking in the direction of the arrows;

Fig. 5 is a plan view of a solar heat absorption unit of the pressure type, the tubes thereof being shown flattened in form;

Fig. 6 is a section on line 6—6 of Fig. 5, looking in the direction of the arrows;

Fig. 7 is a section on line 7—7 of Fig. 5, looking in the direction of the arrows;

Fig. 8 is an enlarged section of the end of one of the tubes shown in Fig. 5, showing its connection with intake or outlet conduit.

Figure 1:
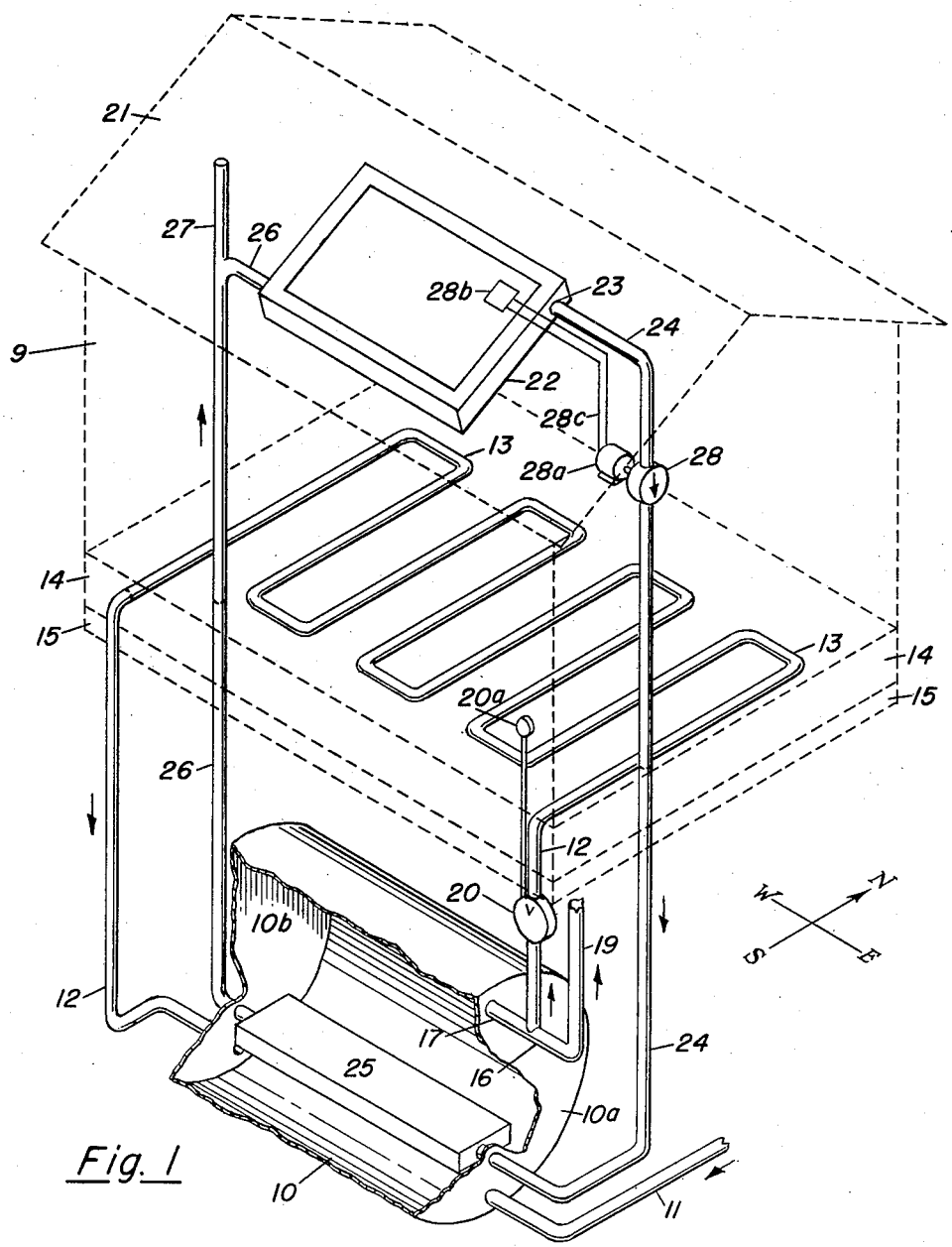
Figure 9:
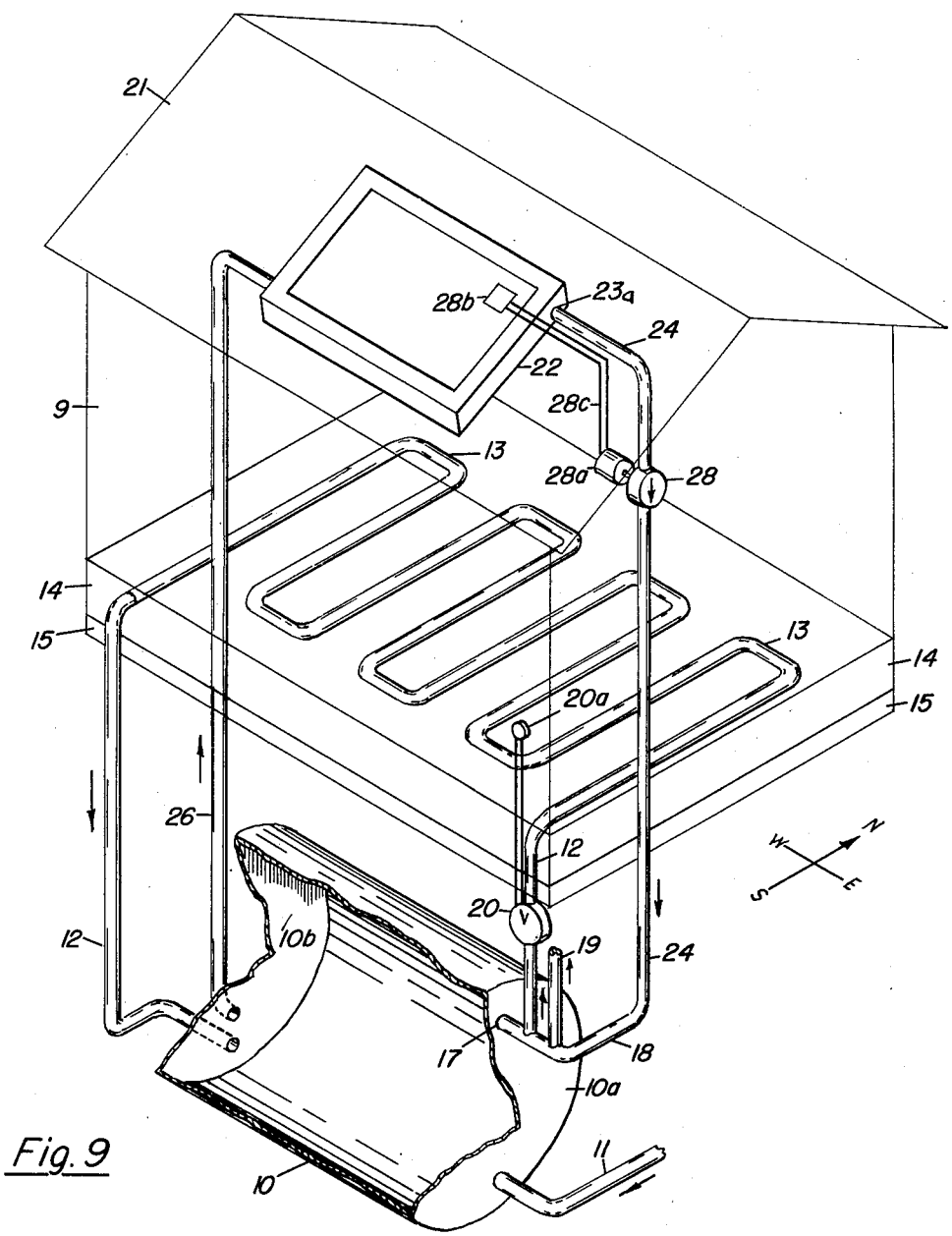
Fig. 9 is a view of a modification of the assembly shown in Fig. 1, illustrating the adaptation of the same to the pressure type of my invention.

Referring to the drawings, in Fig. 1, I have shown an outline view of a conventional building 9, showing an assembly of water tanks and conduits embodying my invention; including a closed unreplenished water circulatory system directly connected with the solar heat absorption unit and an open circulatory system connected with and supplied by the main water line. As shown, a well insulated hot water tank 10 is installed in the basement or under the bottom floor of the building; the lower part of one end 10a of said tank being connected to the supply pipe 11 leading from said main water supply, and the upper part of said end 10a being connected with the egress pipe 16, from which extends upwardly the conduit 12 leading to and merging into the heating coils 13 and the take-off pipe 19 leading to bathrooms, toilets, laundry, kitchen or other outlets from which hot water may be dispensed as required. These heating coils are preferably embedded in a layer 14 of ordinary concrete, resting upon a layer of light weight aggregate concrete 15; the two layers forming the floor of the building. From the said coils 13, the conduit 12 leads downwardly and is connected with the lower part of the end 10b of the tank 10, discharging into the same. Preferably the flow of hot water coming from the coils 13 is automatically controlled or arrested by the thermostatic valve 20, which valve is one made responsive only to the temperature control 20a of the room just above said heating coils.

Located upon the slanting roof 21 of the building 9, or preferably made a part thereof and flush therewith, is the closed box 22 of the solar heating unit 23, preferably in the Northern hemisphere inclined so as to face south toward the orbit of the sun. Leading out of the upper part of the hollow of said box 22 is an outlet pipe, the threaded end of which is detachably secured to the conduit 24, which, extending downwardly, enters the lower part of the tank 10, through its end 10a where it leads into and is connected with one end of the elongated closed box of the heat dispensing unit 25, and connected with and leading out of the other end of said elongated box and through the adjacent end 10b of said tank 10, is the conduit 26, which passing upwardly is connected with the threaded end of the inlet pipe leading into the lower part of the hollow of the box 22 of the heater unit 23. By reason of the connections of conduits 24 and 26 with the respective threaded ends of the inlet and outlet pipes of the box 22, the said solar heating unit 23 is obviously readily detachable therefrom, and is thereby made portable for camping or out of door purposes. If desired, at some portion of this closed circulatory system may be installed and connected a conventional air chamber 27 to guard against excessive pressure from the water therein, resulting from its expansion upon the heating thereof. Also a conventional pump 28, suitably connected to the conduit 24 and actuated by a motor 28a, is provided for the purpose of maintaining the circulation of water to and from the unit 23, and for bringing such water to, and keeping it at, the desired temperatures; a conventional thermostat 28b connected by the electric wiring 28c with both said unit and pump serving to guard against circulation of the water above excessive temperatures.

In Figs. 2, 3 and 4, I have illustrated a form of my solar heat absorption unit 23, comprising the square or rectangular double walled box 22, the space 29 between the walls 30 and 31 of which is closed by the frame 32 and is filled with rock wool 33 or other suitable heat insulation material. Hermetically closing the mouth of the said box are two panes 35 and 36 of glass or other suitable transparent material, in parallel relation, and preferably spaced one quarter of an inch apart. Just below the pane 36 and closely spaced therefrom is the corrugated metal partition 37, extending from wall to wall in the interior of said box, and hermetically sealed therefrom; the said corrugations being preferably positioned due north and south and contoured so as to receive on some part thereof the direct rays of the sun. Below the said partition is formed the hollow 38 of the box forming a shallow reservoir within which the flowing water of the system is exposed and subjected to the heat of the sun, and into and out of which reservoir such water is pumped by the pump 28 in effecting the circulation thereof to raise the same to the desired temperatures.

In the operation of the closed circuit assembly shown in Figs. 1 to 4, inclusive, the solar heating unit 23, conduit 24, heat dispensing unit 25, and conduit 26, are first completely filled with clean water, to which may be added an antifreezing mixture if necessary in climates where freezing temperatures are to be encountered. This step when accomplished forms a self contained circulating system without necessity of replenishment or cleansing except at rare and extended intervals. At the same time or previous thereto, the tank 10, conduit 12, coils 13, and egress pipe 16 and outlets therefrom, have been filled and continuously supplied with water coming through the pipe 11 connected with the water main. Thereafter, the face of the solar heating unit 23 is exposed to the rays of the sun, and the temperature of the water of said unit rises, and when it reaches from 140 to 150 degrees Fahrenheit as indicated by the thermostat 28b, the motor 28a is automatically started and the pump 28 caused to operate, pumping the heated water from the reservoir 38 of said unit 23 down through the conduit 24 into the hollow of the box of unit 25 inside the tank 10, the contents of which tank are thereby caused to be heated. Thence, the water of unit 25 passes upwardly through the conduit 26 back to the heating unit 23, and thereafter continues to be pumped and to circulate through the system. If the said temperature of the water in the heating unit 23 drops below the range above specified, or rises above 212 degrees Fahrenheit, the thermostat 28b is adjusted automatically to stop the motor 28a and to shut off the pump 28.

As the result of the rise in temperature of the mass of water concentrated by the heat dispensing unit 25, and passing in and out of the same, the temperature of the larger volume of water contained in the tank 10 and contacting the wall of said unit will rise correspondingly; and following the law of heat transfusion in liquids and solids will of its own accord tend to pass out of said tank upwardly through conduit 12 from the egress pipe 16 into and through the coil 13, where it will serve to heat the room above, such heat being diffused upwardly through concrete layer 14. Here the temperature of the room is controlled by the thermostatic valve 20, which acts automatically to arrest the circulation of the water upwardly through the lower portion of the conduit 12 when the desired temperature is reached; while allowing the heated water to be drawn off for domestic purposes from the top of said tank through take-off conduit 19.

In Figs. 5 to 9, inclusive, I have illustrated a form of heat absorption unit 23a, adapted to be used for the pressure type of my invention, and being substantially identical with the unit 23, except that for the corrugated metal partition 37, I have substituted a tubular assembly 39, comprising the extended intake tube or conduit 26a, the extended outlet tube or conduit 24a, and the series of tubes 40 communicating therewith and extending in parallel formation therebetween; the said tubes being flattened with connected adjacent walls so as to eliminate waste absorption areas and so as to take full advantage of the direct impact of the rays of the sun. Also further to adapt the said unit 23a to the pressure type of my invention, I eliminate the heat dispensing box 25, and as indicated in dotted lines 18 in Fig. 1, I move the connection of the discharge end of the conduit 24 to the upper part of the tank 10, while leaving open the egress connection of said tank with the conduit 26. Through such changed arrangement of conduits, the hot water coming from the heating unit 23a is pumped first into the top of the tank 10, from whence the water of the tank passes outwardly through the conduit 26 back to the heating unit 23a, and through the egress pipe 16 to the coils 13 or to the takeoff conduit 19; the water from the coil 13 being returned to the tank through the end of the conduit 12 discharging into said tank through its end 10b.

My invention may be embodied in other specific forms without departing from the spirit or essential characteristics thereof. The present embodiments, as above set forth, are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. A solar heating assembly, comprising a portable detachable insulated heat absorption box, having a window therein inclined to the orbit of the sun, a series of flattened pipes connected in parallel with adjacent connected walls constituting a water reservoir with inlet and outlet mounted within said box and being exposed through said window to the rays of the sun, said parallel pipes being positioned to run due north and south and contoured to receive thereon the said rays and to transmit the heat thereof to the water of said reservoir; a hot water tank with takeoff outlets therefrom; and means for circulating the water thereof to and from said reservoir.

2. A solar heating assembly, comprising a building, a portable detachable insulated heat absorption unit box containing a water reservoir mounted upon the roof of said building and having a window therein; said window being inclined to the orbit of the sun and said box having a corrugated partition therein adjacent to said window and positioned to receive therethrough the direct rays of the sun, which corrugations are located to run substantially north and south to transmit the heat of said rays to the water of said reservoir; a hot water tank secured within said building to the frame thereof, with a circulation system incorporating heating coils mounted within said building and a conduit connected with said coils and forming therewith a continuous passageway extending from an outside water intake into said tank and outwardly therefrom to take off outlets and back to said tank; a heat dispensing unit receptacle mounted within said tank and sealed off therefrom, and means independent of said circulatory system for circulating water from said unit receptacle to and from the reservoir of said unit box.

3. A solar heating assembly, comprising a building, a portable detachable insulated heat absorption unit box containing a series of flattened pipes connected in parallel to form a water reservoir mounted upon the roof of said building and having a window therein; said window being inclined to the orbit of the sun positioned to receive upon said pipes the direct rays of the sun, and said pipes having connected adjacent with and being positioned to run substantially north and south and to transmit the heat of said rays to the water of said reservoir; a hot water tank secured within said building to the frame thereof, with a circulation system incorporating heating coils mounted within said building and a conduit connected with said coils and forming therewith a continuous passageway extending from an outside water intake into said tank and outwardly therefrom to take off outlets and back to said tank, and means for circulating water from said hot water tank to and from the reservoir of said unit box.

4. A solar heating assembly, comprising a portable detachable closed insulated heat absorption box having a window in the top thereof and a partition therein sealing off a reservoir below, said partition being located beneath said window and positioned to receive the rays of the sun; a hot water tank separated from said box; a circulatory water pipe system forming a continuous passageway extending from a water intake into said tank and outwardly therefrom to take off outlets and back to said tank; a heat dispensing conduit mounted within said tank and sealed off therefrom; and means independent of said circulatory water pipe system for circulating water to and from said reservoir through said heat dispensing conduit.

5. A solar heating assembly, comprising a building, a portable detachable insulated heat absorption box having a window in the top thereof and a partition therein sealing off a reservoir below, said partition being located beneath said window and positioned to receive the rays of the sun; a hot water tank secured within said building to the frame thereof; a circulatory water pipe system incorporating heating coils mounted within said building and a conduit connected with said coils and forming therewith a continuous passageway extending from an outside water intake into said tank and outwardly therefrom to take off outlets and back to said tank; a heat dispensing unit receptacle mounted within said tank and sealed off therefrom; and means independent of said circulatory water pipe system for circulating water to and from said reservoir through said heat dispensing unit receptacle.

LEO W. CORNWALL.

REFERENCES CITED

The following references are of record in the file of this patent:

UNITED STATES PATENTS

| Number | Name | Date |
| --- | --- | --- |
| 230,323 | Molera et al. | July 20, 1880 |
| 682,658 | Wishart | Sept. 17, 1901 |
| 695,136 | Baker | Mar. 11, 1902 |
| 1,242,511 | Bailey | Oct. 9, 1917 |
| 1,696,003 | Harvey | Dec. 18, 1928 |
| 1,810,798 | Tellander | June 16, 1931 |
| 1,853,480 | Wheeler et al. | Apr. 12, 1932 |
| 1,888,620 | Clark | Nov. 22, 1932 |
| 2,238,362 | Goehler | Apr. 15, 1941 |
| 2,342,211 | Newton | Feb. 22, 1944 |
| 2,396,338 | Newton | Mar. 12, 1946 |

FOREIGN PATENTS

| Number | Country | Date |
| --- | --- | --- |
| 529,163 | France | Sept. 24, 1921 |
| 801,627 | France | May 23, 1936 |
| 49,346 | France | Nov. 12, 1938 |
| | (Addition to 801,627) | |